US011637304B2

(12) United States Patent
Namba et al.

(10) Patent No.: US 11,637,304 B2
(45) Date of Patent: Apr. 25, 2023

(54) FUEL CELL SYSTEM AND CONTROL METHOD FOR FUEL CELL SYSTEM

(71) Applicant: TOYOTA JIDOSHA KABUSHIKI KAISHA, Toyota (JP)

(72) Inventors: Ryouichi Namba, Okazaki (JP); Asuka Takasaki, Toyota (JP); Hiroyuki Tsunekawa, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 175 days.

(21) Appl. No.: 17/236,575

(22) Filed: Apr. 21, 2021

(65) Prior Publication Data

US 2021/0376359 A1 Dec. 2, 2021

(30) Foreign Application Priority Data

May 29, 2020 (JP) .............................. JP2020-094406

(51) Int. Cl.
| | | |
|---|---|---|
| *H01M 8/04858* | (2016.01) | |
| *H01M 16/00* | (2006.01) | |
| *H01M 10/44* | (2006.01) | |
| *H01M 8/04746* | (2016.01) | |

(52) U.S. Cl.
CPC ... *H01M 8/04895* (2013.01); *H01M 8/04753* (2013.01); *H01M 10/44* (2013.01); *H01M 16/006* (2013.01); *H01M 2220/20* (2013.01); *H01M 2250/20* (2013.01)

(58) Field of Classification Search
CPC ............... H01M 10/44; H01M 16/006; H01M 2220/20; H01M 2250/20; H01M 8/04753; H01M 8/0488; H01M 8/04895; H01M 8/0491; Y02E 60/10; Y02E 60/50; Y02T 10/70; Y02T 90/40
See application file for complete search history.

(56) References Cited

U.S. PATENT DOCUMENTS

2010/0233560 A1    9/2010  Kajiwara

FOREIGN PATENT DOCUMENTS

| JP | 2007141744 A | 6/2007 |
|---|---|---|
| JP | 2009099341 A | 5/2009 |

*Primary Examiner* — Victoria H Lynch
(74) *Attorney, Agent, or Firm* — Dickinson Wright, PLLC

(57) ABSTRACT

The low efficiency power generation part of a control device is provided with an operating point setting part setting a target current and a target voltage defining an operating point of the fuel cell at the time of low efficiency power generation and a generated electric power control part making the generated electric power of the fuel cell increase and decrease at the time of low efficiency power generation by controlling the current of the fuel cell to the target current while making the flow rate of feed of oxidizing agent gas supplied to the fuel cell fluctuate so that the voltage of the fuel cell increases and decreases above and below the target voltage within a range where the charged and discharged electric powers of the rechargeable battery do not become larger than the allowable charged and discharged electric powers.

2 Claims, 12 Drawing Sheets

FUEL CELL SYSTEM AND CONTROL METHOD FOR FUEL CELL SYSTEM

FIELD

The present disclosure relates to a fuel cell system and a control method for a fuel cell system.

BACKGROUND

Japanese Unexamined Patent Publication No. 2009-099341 discloses, as a conventional fuel cell system, for example, one which performs low efficiency power generation where the power generation loss becomes greater than normal power generation at the time of system startup or another predetermined timing to thereby perform a rapid warmup operation making the amount of self heat generation of the fuel cell increase to make the fuel cell rapidly warm up.

SUMMARY

At the time of low efficiency power generation, to enlarge the concentration overvoltage and make the power generation loss increase, assuming the same generated electric power, the flow rate of the feed of oxidizing agent gas to be supplied to the fuel cell becomes smaller than the time of normal power generation. That is, the target value of the air stoichiometric ratio set at the time of low efficiency power generation (ratio of flow rate of feed of oxidizing agent gas actually supplied to minimum flow rate of feed of oxidizing gas required for generating target generated electric power) becomes smaller than the target value of the air stoichiometric ratio set at the time of normal power generation. Further, at the time of low efficiency power generation, which is performed in a state where the air stoichiometric ratio is made smaller than the time of normal power generation, when the air stoichiometric ratio deviates from its target value, the extent of fluctuation of the voltage of the fuel cell tends to becomes greater than the time of normal power generation.

Therefore, at the time of transition where the target generated electric power changes, until the flow rate of feed of oxidizing agent gas is controlled to the post-transition target flow rate, the air stoichiometric ratio will deviate from the post-transition target value. Therefore, at the time of low efficiency power generation, during transition, the actual voltage of the fuel cell will tend to greatly deviate from the target voltage. As a result, the actual generated electric power will tend to greatly deviate from the target generated electric power.

If the actual generated electric power becomes greater than the target generated electric power, the excess electric power at that time is charged to the battery. On the other hand, if the actual generated electric power becomes smaller than the target generated electric power, the insufficient amount of electric power at that time is discharged from the battery. For this reason, if the deviation of the actual generated electric power with respect to the target generated electric power becomes greater, the battery becomes overcharged in state or overdischarged in state and the battery is liable to deteriorate. The allowable charged electric power and allowable discharged electric power of the battery change according to the battery temperature. The lower the battery temperature becomes, the smaller they tend to become.

Therefore, if low efficiency power generation is performed in a low temperature environment, in particular there is the problem that the battery will easily become an overcharged state or overdischarged state and the battery will easily deteriorate.

The present disclosure was made focusing on such a problem point and has as its object to keep the battery from becoming an overcharged state or overdischarged state at the time of low efficiency power generation and the battery from deteriorating.

To solve this technical problem, the fuel cell system according to one aspect of the present disclosure comprises: a fuel cell configured to generate electric power by electrochemical reactions between a fuel gas and oxidizing agent gas; a rechargeable battery configured to be charged with excess electric power and discharge an insufficient amount of electric power at the time of electric power generation of the fuel cell; and a control device. The control device comprises a low efficiency power generation part configured to perform low efficiency power generation in which the power generation loss becomes greater than normal power generation. The low efficiency power generation part comprises an operating point setting part configured to set a target current and target voltage giving an operating point of the fuel cell at the time of low efficiency power generation and a generated electric power control part configured to control a current of the fuel cell to a target current at the time of low efficiency power generation, and to make the generated electric power increase and decrease by making a flow rate of feed of oxidizing agent gas supplied to the fuel cell change so that a voltage of the fuel cell increases and decreases above and below the target voltage within a range where the charged and discharged electric powers of the rechargeable battery do not become larger than the allowable charged and discharged electric powers of the rechargeable battery.

Further, a control method for the fuel cell system according to one aspect of the present disclosure comprises: setting a target current and target voltage defining an operating point of the fuel cell, at the time of low efficiency power generation in which a power generation loss becomes greater than in normal power generation; and controlling the current of the fuel cell to the target current at the time of low efficiency power generation, and making the generated electric power increase and decrease by making a flow rate of feed of oxidizing agent gas supplied to the fuel cell change so that a voltage of the fuel cell increases and decreases above and below the target voltage within a range where the charged and discharged electric powers of the rechargeable battery do not become larger than the allowable charged and discharged electric powers of the rechargeable battery.

According to these aspect of the present disclosure, by controlling the current of the fuel cell to the target current while making the voltage of the fuel cell increase and decrease so as become above and below the target voltage, it is possible to make the generated electric power increase and decrease above and below the target generated electric power. For this reason, it is possible to repeatedly charge and discharge the battery (rechargeable battery), so it is possible to quickly raise the temperature of the battery. As a result, it is possible to quickly enlarge the allowable charged and discharged electric powers of the battery, so when low efficiency power generation is performed and deviation occurs between the generated electric power and target generated electric power, the battery can be kept from becoming an overcharged state or overdischarged state.

DESCRIPTION OF EMBODIMENTS

Below, an embodiment of the present disclosure will be explained in detail with reference to the drawings. Note that, in the following explanation, similar component elements are assigned the same reference notations.

Figure 1:
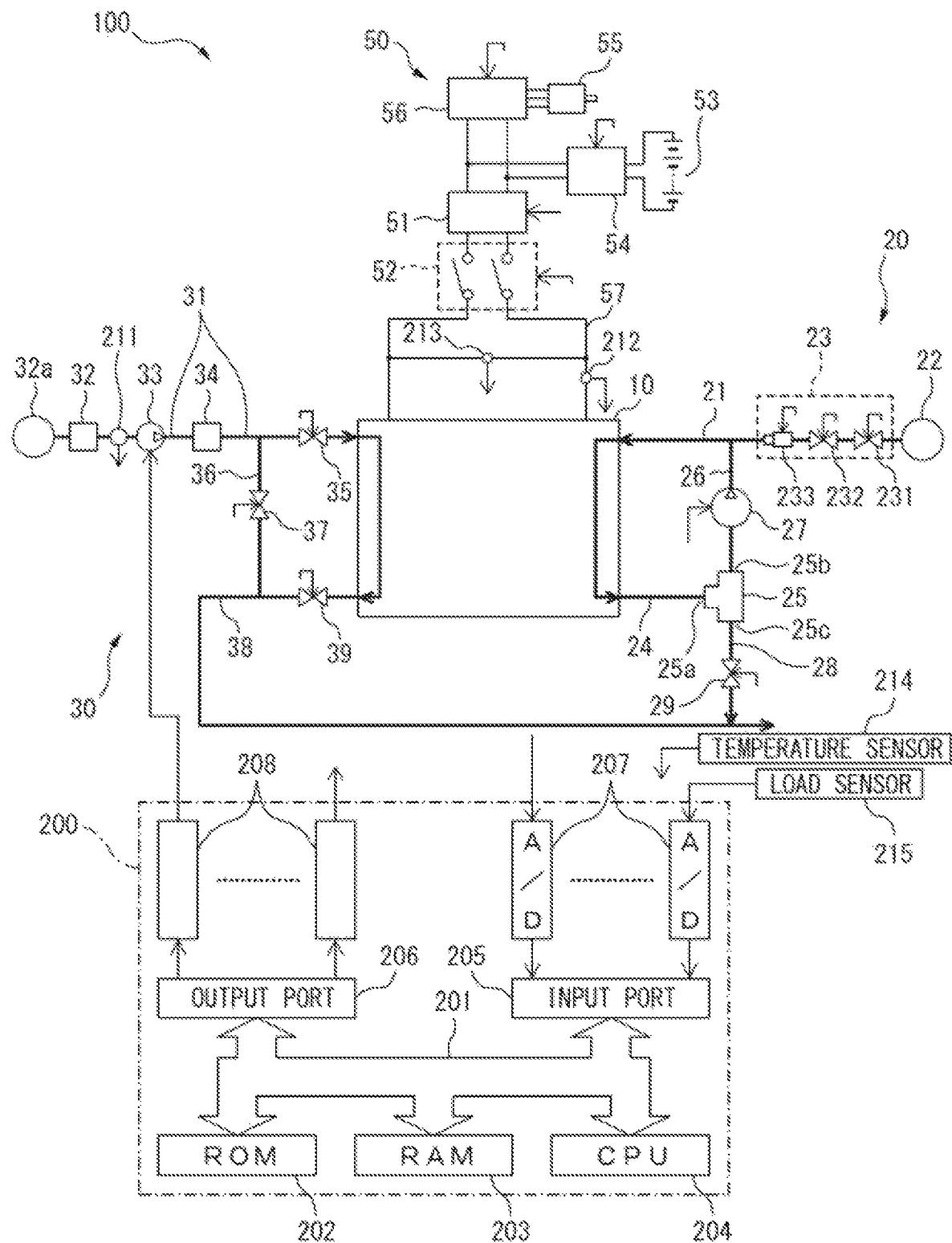
FIG. 1 is a schematic view of the configuration of a fuel cell system according to one embodiment of the present disclosure.

FIG. 1 is a schematic view of the configuration of a fuel cell system 100 according to one embodiment of the present disclosure mounted in a vehicle.

The fuel cell system 100 is provided with a fuel cell stack 10, a hydrogen feed device 20 for supplying hydrogen to the fuel cell stack 10 as an anode gas (fuel gas), an air feed device 30 for supplying air to the fuel cell stack 10 as a cathode gas (oxidizing agent gas), an electrical load part 50 electrically connected to an output terminal of the fuel cell stack 10, and an electronic control unit 200 for overall control of the various control parts of the fuel cell system 100.

The fuel cell stack 10 is comprised of a plurality of fuel cell unit cells (hereinafter referred to as "unit cells") stacked together along the stacking direction with the unit cells electrically connected in series. The unit cells are provided with MEA (membrane electrode assemblies).

Each MEA is comprised of a proton conducting ion exchange membrane formed by a solid polymer material (hereinafter referred to as a "electrolytic membrane") on one surface of which an anode electrode is formed and on the other surface a cathode electrode is formed—all of which are integrally joined. When electric power is being generated at the fuel cell stack 10, the following electrochemical reactions occur at the anode electrode and cathode electrode:

Anode electrode: $2H_2 \rightarrow 4H^+ + 4e^-$  (1)

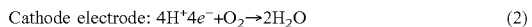

Cathode electrode: $4H^+ 4e^- + O_2 \rightarrow 2H_2O$  (2)

The anode electrode and the cathode electrode are respectively provided with catalyst layers comprised of porous carbon materials in which a catalyst is supported. The catalyst layers contain platinum as a catalyst for promoting the electrochemical reactions between the hydrogen and oxygen (hydrogen oxidation reaction of formula (1) and oxygen reduction reaction of formula (2)). Note that, the two outer sides of the MEA may also further be provided with an anode gas diffusion layer and a cathode gas diffusion layer.

The hydrogen feed device 20 is provided with a hydrogen feed pipe 21, a high pressure hydrogen tank 22 as a hydrogen source, a hydrogen feed control part 23, an anode off-gas pipe 24, a gas-liquid separator 25, a hydrogen return pipe 26, a hydrogen recirculation pump 27, a purge pipe 28, and a purge control valve 29.

The hydrogen feed pipe 21 is a pipe through which hydrogen supplied to the fuel cell stack 10 flows. One end is connected to the high pressure hydrogen tank 22, while the other end is connected to the fuel cell stack 10.

The high pressure hydrogen tank 22 stores the hydrogen supplied through the hydrogen feed pipe 21 to the fuel cell stack 10 and in turn the anode electrodes of the unit cells.

The hydrogen feed control part 23 is provided with a main check valve 231, a regulator 232, and an injector 233.

The main check valve 231 is a solenoid valve which is opened and closed by the electronic control unit 200 and is provided at the hydrogen feed pipe 21. If the main check valve 231 is opened, hydrogen flows out from the high pressure hydrogen tank 22 to the hydrogen feed pipe 21. If the main check valve 231 is closed, the outflow of hydrogen from the high pressure hydrogen tank 22 is stopped.

The regulator 232 is provided at the hydrogen feed pipe 21 downstream from the main check valve 231. The regulator 232 is a pressure control valve able to be adjusted in opening degree continuously or in steps. Its opening degree is controlled by the electronic control unit 200. By controlling the opening degree of the regulator 232, the pressure of the hydrogen at the downstream side from the regulator 232, that is, the pressure of the hydrogen injected from the injector 233, is controlled.

The injector 233 is provided at the hydrogen feed pipe 21 downstream from the regulator 232. The injector 233 is, for example, a needle valve and is controlled to open and close by the electronic control unit 200. By controlling the opening time period of the injector 233, the flow rate of the hydrogen injected from the injector 233 is controlled.

In this way, using the hydrogen feed control part 23, the feed of hydrogen from the high pressure hydrogen tank 22 to the fuel cell stack 10 is controlled. That is, using the hydrogen feed control part 23, hydrogen controlled to the desired pressure and flow rate is supplied to the fuel cell stack 10.

The anode off-gas pipe 24 is a pipe through which anode off-gas which had flowed out from the fuel cell stack 10 flows. One end is connected to the fuel cell stack 10, while the other end is connected to a gas inflow port 25a of the gas-liquid separator 25. The anode off-gas is gas containing the excess hydrogen which was not used for the electrochemical reactions in each unit cell and the nitrogen and other inert gas and water content (liquid water and steam) which permeated from the cathode side through the MEA to the anode electrode side.

The gas-liquid separator 25 is provided with a gas inflow port 25a, a gas outflow port 25b, and a liquid water outflow port 25c. The gas-liquid separator 25 separates the water in the anode off-gas flowing from the gas inflow port 25a to the inside. Further, the gas-liquid separator 25 discharges the separated water from the liquid water outflow port 25c to a purge pipe 28 and discharges the anode off-gas containing hydrogen from which water was separated from the gas outflow port 25b to a hydrogen return pipe 26.

The hydrogen return pipe 26 is a pipe with one end connected to the gas outflow port 25b of the gas-liquid separator 25 and with the other end connected to the hydrogen feed pipe 21 downstream from the hydrogen feed control part 23. At the hydrogen return pipe 26, the anode off-gas discharged from the gas outflow port 25b of the gas-liquid separator 25 flows.

The hydrogen recirculation pump 27 is provided at the hydrogen return pipe 26. The hydrogen recirculation pump 27 is a pump for recirculating the hydrogen contained in the anode off-gas, that is, the excess hydrogen which was not used for the electrochemical reactions in each cell, by returning it to the hydrogen feed pipe 21. The hydrogen recirculation pump 27 pressurizes the anode off-gas discharged from the gas outflow port 25b of the gas-liquid separator 25 and pumps it to the hydrogen feed pipe 21.

The purge pipe 28 is a pipe with one end connected to the liquid water outflow port 25c of the gas-liquid separator 25 and with the other end connected to a later explained cathode off-gas pipe 38.

The purge control valve 29 is a solenoid valve which is opened and closed by the electronic control unit 200 and is provided at the purge pipe 28. The purge control valve 29 is usually closed and is periodically opened over short time periods. If the purge control valve 29 is opened, the water separated inside the gas-liquid separator 25 is discharged through the purge pipe 28 from the cathode off-gas pipe 38 to the outside.

In this way, the fuel cell system 100 according to the present embodiment is a hydrogen recirculation type of fuel cell system which recirculates the anode off-gas flowing out from the hydrogen passage 2 by returning it to the hydrogen feed pipe 21, but it may also be made a nonhydrogen recirculating type of fuel cell system in which the anode off-gas flowing out from the hydrogen passage 2 is not returned to the hydrogen feed pipe 21.

The air feed device 30 is provided with an air feed pipe 31, air cleaner 32, compressor 33, intercooler 34, cathode inlet valve 35, bypass pipe 36, distribution valve 37, cathode off-gas pipe 38, and cathode pressure control valve 39.

The air feed pipe 31 is a pipe through which air flows for supply to the fuel cell stack 10 and in turn the cathode electrode of each unit cell. One end is connected to the air cleaner 32, while the other end is connected to the fuel cell stack 10.

The air cleaner 32 removes the foreign matter in the air sucked into the air feed pipe 31. The air cleaner 32 is arranged in the atmosphere which serves as the oxygen source 32a. That is, the oxygen source 32a communicates with the air feed pipe 31 through the air cleaner 32.

The compressor 33, for example, is a centrifugal type or axial flow type of turbo compressor and is provided at the air feed pipe 31. The compressor 33 compresses and discharges the air sucked into the air feed pipe 31 through the air cleaner 32. Note that, at the air feed pipe 31 upstream from the compressor 33, a cathode flow rate sensor 211 is provided for detecting the flow rate of air sucked in and discharged by the compressor 33 (below, referred to as the "total air feed quantity") Qacp [NL/min].

The intercooler 34 is provided at the air feed pipe 31 downstream from the compressor 33 and cools the air discharged from the compressor 33 for example by the outside air stream or cooling water etc.

The cathode inlet valve 35 is a valve which is opened and closed by the electronic control unit 200 and is provided at the air feed pipe 31 downstream from the intercooler 34. The cathode inlet valve 35 is opened when it is necessary to supply air to the fuel cell stack 10.

The bypass pipe 36 is a pipe for making part or all of the air discharged from the compressor 33 directly flow into the later explained cathode off-gas pipe 38 without passing through the fuel cell stack 10 in accordance with need. The bypass pipe 36 is connected at one end to the air feed pipe 31 between the intercooler 34 and cathode inlet valve 35 and at the other end to the cathode off-gas pipe 38 downstream from the later explained cathode pressure control valve 39.

The distribution valve 37 is provided in the bypass pipe 36. The distribution valve 37 is a solenoid valve which can be adjusted in opening degree continuously or in steps. Its opening degree is controlled by the electronic control unit 200.

The cathode off-gas pipe 38 is a pipe through which cathode off-gas flowing out from the fuel cell stack 10 flows. One end is connected to the fuel cell stack 10, while the other end is opened to the atmosphere. The cathode off-gas is a gas containing the excess oxygen which was not used for the electrochemical reactions in each unit cell and the nitrogen or other inert gas and water content generated by the electrochemical reactions (liquid water or steam).

The cathode pressure control valve 39 is provided in the cathode off-gas pipe 38. The cathode pressure control valve 39 is a solenoid valve which can be adjusted in opening degree continuously or in steps. Its opening degree is controlled by the electronic control unit 200. By controlling the opening degree of the cathode pressure control valve 39, the pressure inside the fuel cell stack 10, that is, the cathode pressure, is controlled.

By controlling the compressor 33 and in turn the total air feed quantity Qafc and the respective opening degrees of the cathode inlet valve 35, distribution valve 37, and cathode pressure control valve 39, the flow rate Qfc [NL/min] of the air supplied to the fuel cell stack 10 in the air discharged from the compressor 33 (below, referred to as the "FC air feed quantity") is controlled.

The electrical load part 50 is provided with a first converter 51, circuit breaker 52, battery 53, second converter 54, motor-generator 55, and inverter 56.

At the connection line 57 between the electrical load part 50 and the output terminal of the fuel cell stack 10, a current sensor 212 for detecting the current Ifc [A] taken out from the fuel cell stack 10 (below, referred to as the "FC current") and a voltage sensor 213 for detecting the terminal voltage Vfc [V] of the output terminal of the fuel cell stack 10 (below, referred to as the "FC voltage") are provided.

The first converter 51 is a bidirectional DC/DC converter provided with an electrical circuit able to raise and lower the terminal voltage at the primary side terminal. The primary side terminal is connected to the output terminal of the fuel cell stack 10 while the secondary side terminal is connected to the DC side terminal of the inverter 56. The first converter 51 raises and lowers the FC output voltage Vfc becoming the primary side terminal voltage based on a control signal from the electronic control unit 200 and due to this controls the FC current Ifc to the target FC current Itg set according to the operating state of the fuel cell system 100.

The circuit breaker 52 is opened and closed by the electronic control unit 200 and electrically and physically connects or disconnects the fuel cell stack 10 and the electrical load part 50.

The battery 53, for example, is a nickel-cadmium storage battery, a nickel-hydrogen storage battery, a lithium ion battery, or other rechargeable secondary cell. The battery 53 is charged with excess electric power of the fuel cell stack 10 and regenerated electric power of the motor-generator 55. The electric power charged to the battery 53 is in accordance with need used for driving the motor-generator 55, compressor 33, and other various types of control parts which the fuel cell system 100 is provided with.

The second converter 54 is, for example, a bidirectional DC/DC converter provided with an electrical circuit able to raise and lower the terminal voltage of the secondary side terminal. Its primary side terminal is connected to the output terminal of the battery 53 while its secondary side terminal is connected to the DC side terminal of the inverter 56. The second convener 54 makes the input voltage of the inverter 56 becoming the terminal voltage of the secondary side rise and fall based on the control signal from the electronic control unit 200.

The motor-generator 55 is, for example, a three-phase permanent magnet type synchronous motor which is provided with a function as a motor for generating drive power of the vehicle in which the fuel cell system 100 is mounted and a function as a generator generating electric power at the time of deceleration of the vehicle. The motor-generator 55 is connected to the AC side terminal of the inverter 56 and is driven by the generated electric power of the fuel cell stack 10 and the electric power of the battery 53.

The inverter 56 is provided with an electric circuit able to convert DC current input from a DC side terminal to AC current based on a control signal from the electronic control unit 200 and output it from the AC side terminal and conversely able to convert AC current input from an AC side terminal to DC current based on a control signal from the electronic control unit 200 and output it from the DC side terminal. The DC side terminal of the inverter 56 is connected to the secondary side terminals of the first converter 51 and the second converter 54 while the AC side terminal of the inverter 56 is connected to the input and output terminal of the motor-generator 55. When making the motor-generator 55 function as a motor, the inverter 56 converts the DC current from the fuel cell stack 10 and the battery 53 to AC current (in the present embodiment, three-phase AC current) to supply it to the motor-generator 55. On the other hand, when making the motor-generator 55 function as a generator, the inverter 56 converts the AC current from the motor-generator 55 to DC current to supply it to the battery 53 etc.

The electronic control unit 200 is comprised of a digital computer provided with components connected to each other by a bidirectional bus 201 such as a ROM (read only memory) 202, RAM (random access memory) 203, CPU (microprocessor) 204, input port 205, and output port 206.

At the input port 205, output signals of not only the above-mentioned cathode flow rate sensor 211 or current sensor 212, voltage sensor 213, but also an FC temperature sensor 214 for detecting the temperature Tfc[° C.] of the fuel cell stack 10 (below, referred to as the "FC temperature"), a load sensor 215 for detecting an amount of depression of an accelerator pedal (below, referred to as the "amount of accelerator depression"), etc. are input through corresponding AD converters 207.

At the output port 206, the hydrogen feed control part 23 (main check valve 231, regulator 232, and injector 233) and the hydrogen recirculation pump 27, purge control valve 29, compressor 33, cathode inlet valve 35, distribution valve 37, cathode pressure control valve 39, first converter 51, circuit breaker 52, second converter 54, inverter 56, and other control parts are electrically connected through corresponding drive circuits 208.

The electronic control unit 200 outputs control signals from the output port 206 for controlling the control parts based on the output signals of various sensors input to the input port 205 to control the fuel cell system 100. Below, the control of the fuel cell system 100 which the electronic control unit 200 performs, in particular the rapid warmup control at the time of startup of the fuel cell system 100 below the freezing point, will be explained.

Figure 2:
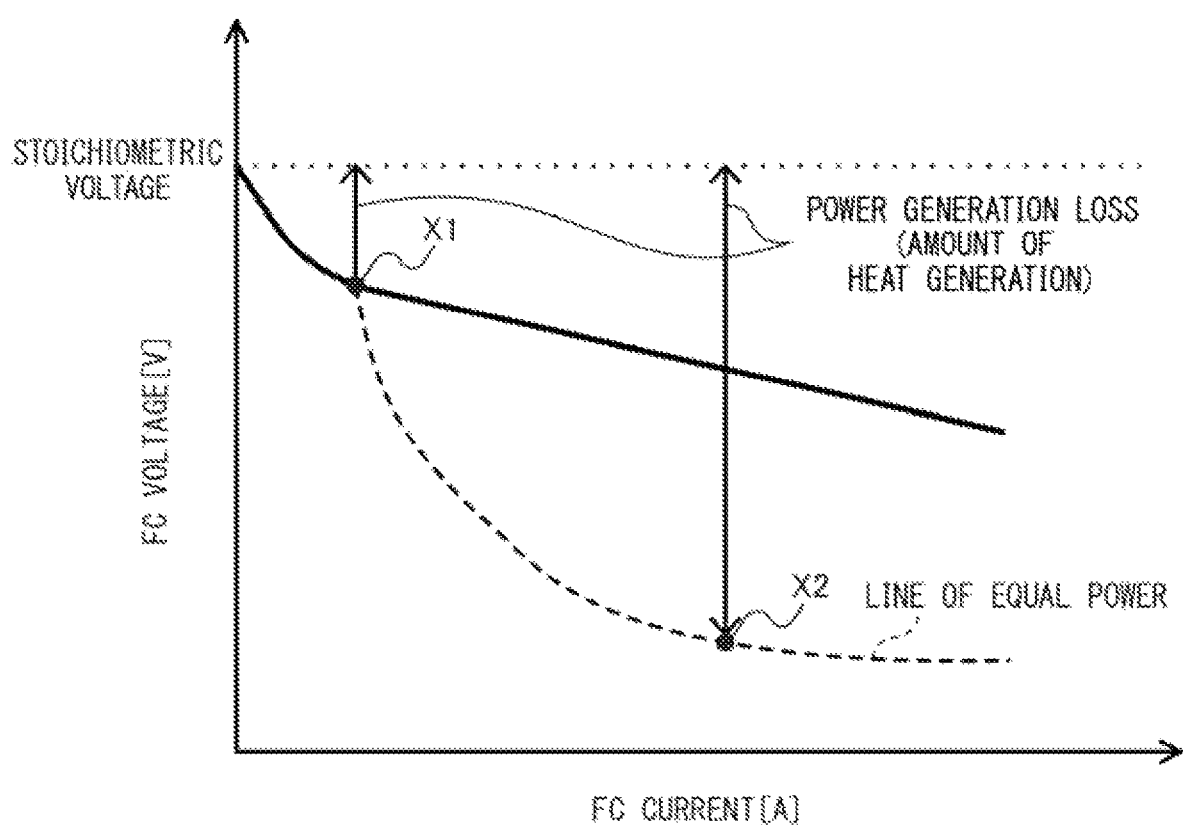
FIG. 2 is a view showing a current-voltage characteristic serving as a standard for a fuel cell stack when an FC temperature is a certain temperature.

FIG. 2 is a view showing a current-voltage characteristic serving as a standard for a fuel cell stack 10 when a stack temperature Tfc is a certain temperature (below, referred to as the "standard IV characteristic"). The standard IV characteristic is the IV characteristic when performing high efficiency power generation suppressing various types of power generation loss occurring at the time of power generation (normal power generation).

The electronic control unit 200 calculates the target generated electric power Ptg [kW] of the fuel cell stack 10 based on the operating state of the fuel cell system 100. In the present embodiment, the electronic control unit 200 calculates the total value of requested electric power of the motor-generator 55 calculated based on the amount of accelerator depression etc. and the requested electric powers of the compressor 33 and other auxiliaries as the target generated electric power Ptg.

Further, as shown in FIG. 2, at the time of normal operation performing high efficiency power generation after the fuel cell stack 10 finishes warming up, the electronic control unit 200 controls the air stoichiometric ratio and in turn the FC air feed quantity Qfc so that the operating point X defined by the FC current Ifc and FC voltage Vfc becomes a normal operating point X1 able to generate the target generated electric power Ptg on the standard IV characteristic.

The "air stoichiometric ratio" is the ratio of the actual FC air feed quantity Qfc with respect to the minimum FC air feed quantity Qst required for generating the target generated electric power Ptg (below, referred to as the "stoichiometric FC air feed quantity"). Therefore, as the air stoichiometric ratio (=Qfc/Qst) becomes greater than 1.0, the actual FC air feed quantity Qfc becomes greater than the stoichiometric FC air feed quantity Qst.

Figure 3:
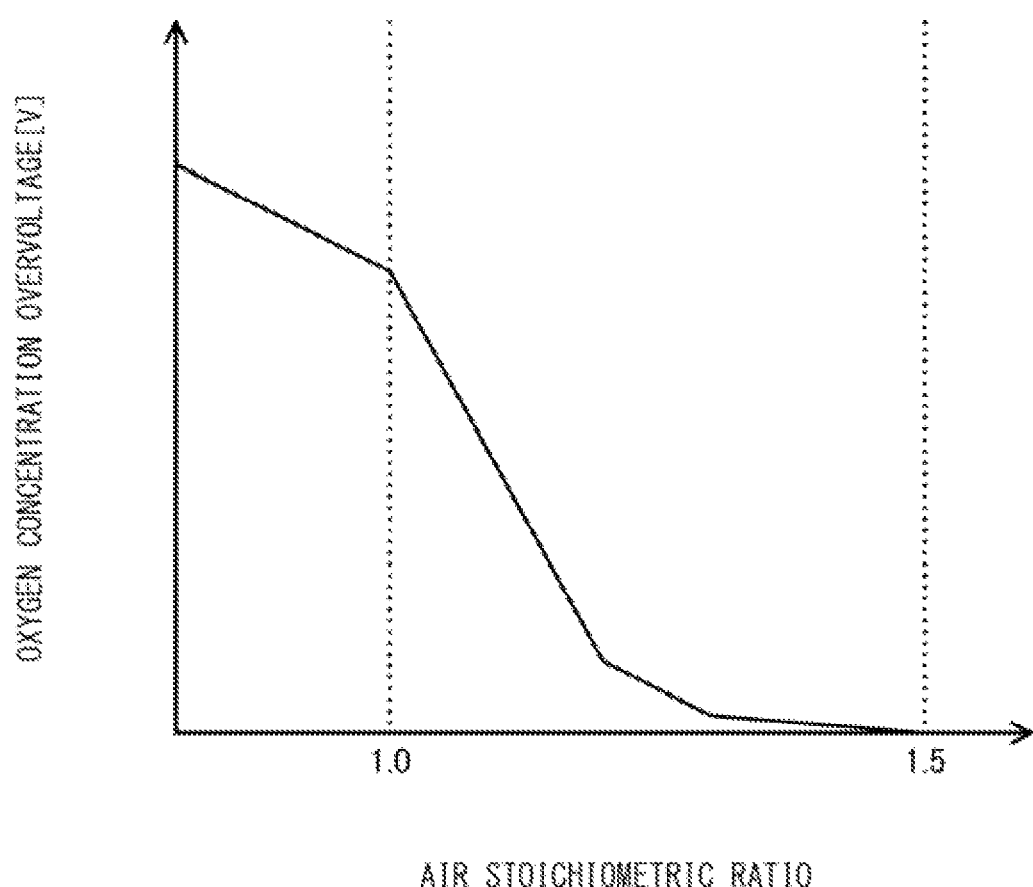
FIG. 3 is a view explaining a relationship of an air stoichiometric ratio and oxygen concentration overvoltage of one factor of power generation loss.

FIG. 3 is a view explaining a relationship of an air stoichiometric ratio and oxygen concentration overvoltage of one factor of power generation loss (power generator loss occurring due to insufficient oxygen at time of power generation).

As shown in FIG. 3, the oxygen concentration overvoltage tends to become larger when the air stoichiometric ratio is small compared to when it is large. In other words, the power generation loss due to the oxygen concentration overvoltage (amount of voltage drop) tends to become larger when the air stoichiometric ratio is small compared to when it is large.

Therefore, at the time of normal operation, the electronic control unit 200 controls the FC air feed quantity Qfc so that the air stoichiometric ratio becomes an air stoichiometric ratio in a normal region where the oxygen concentration overvoltage can be substantially ignored (in the example shown in FIG. 3, for example, an air stoichiometric ratio near 1.5) so as to perform high efficiency power generation kept down in power generation loss.

On the other hand, when starting up and operating a fuel cell system 100 in an environment below the freezing point, the electronic control unit 200 performs a rapid warmup operation so as to keep the water generated along with power generation from freezing while enabling the IV characteristic, which worsens the lower the temperature at the time, to be quickly restored. A rapid warmup operation is a method of operation in which the EC air feed quantity Qfc is controlled to make the oxygen concentration overvoltage increase from the time of normal operation to intentionally make the power generation loss increase and thereby make the amount of self heat generation of the fuel cell stack 10 increase to promote warmup.

At the time of a rapid warmup operation, the electronic control unit 200 controls the FC air feed quantity Qfc so that the air stoichiometric ratio becomes an air stoichiometric ratio in a rapid warmup region where the oxygen concentration overvoltage can no longer be ignored (in the example shown in FIG. 3, for example, an air stoichiometric ratio near 1.0) so as to perform low efficiency power generation generating the target generated electric power Ptg while making the power generation loss (amount of self heat generation) increase over normal operation.

Due to this, compared with the case in FIG. 2 of performing high efficiency power generation (normal power generation) at the normal operating point X1 on the standard IV characteristic, it is possible to make the FC voltage Vfc drop by exactly the amount of the oxygen concentration overvoltage corresponding to the air stoichiometric ratio. That is, by controlling the FC current Ifc while suitably controlling the air stoichiometric ratio and in turn the FC air feed quantity Qfc, as shown in FIG. 2, it is possible to generate electric power at the normal operating point X1 and the rapid warmup operating point X2 making the power generation loss increase from the normal operating point X1 and giving the desired amount of self heat generation on the line of equal power (see broken line), so it is possible to promote warmup of the fuel cell stack 10.

Here, as a result of intensive research by the inventors, it was learned that during this rapid warmup operation, a difference tends to easily arise between the target generated electric power Ptg and the actual generated electric power Pfc and, as a result, the battery charged and discharged electric powers are liable to become larger and cause deterioration of the battery. Below, this problem point will be explained while referring to FIG. 4 in addition to FIG. 3. Note that, FIG. 4 is a view showing changes in the FC voltage Vfc when making the air stoichiometric ratio change (that is, when making the FC air feed quantity Qfc change) while maintaining the FC current Ifc constant.

As shown in FIG. 3, if comparing the amount of change of the oxygen concentration overvoltage when the air stoichiometric ratio changes by exactly a predetermined amount, it tends to become larger when the air stoichiometric ratio is small compared to when it is large. In other words, compared to when the air stoichiometric ratio is large, when it is small, the amount of drop of voltage and in turn the FC voltage Vfc tends to become easier to fluctuate when the air stoichiometric ratio changes.

Figure 4:
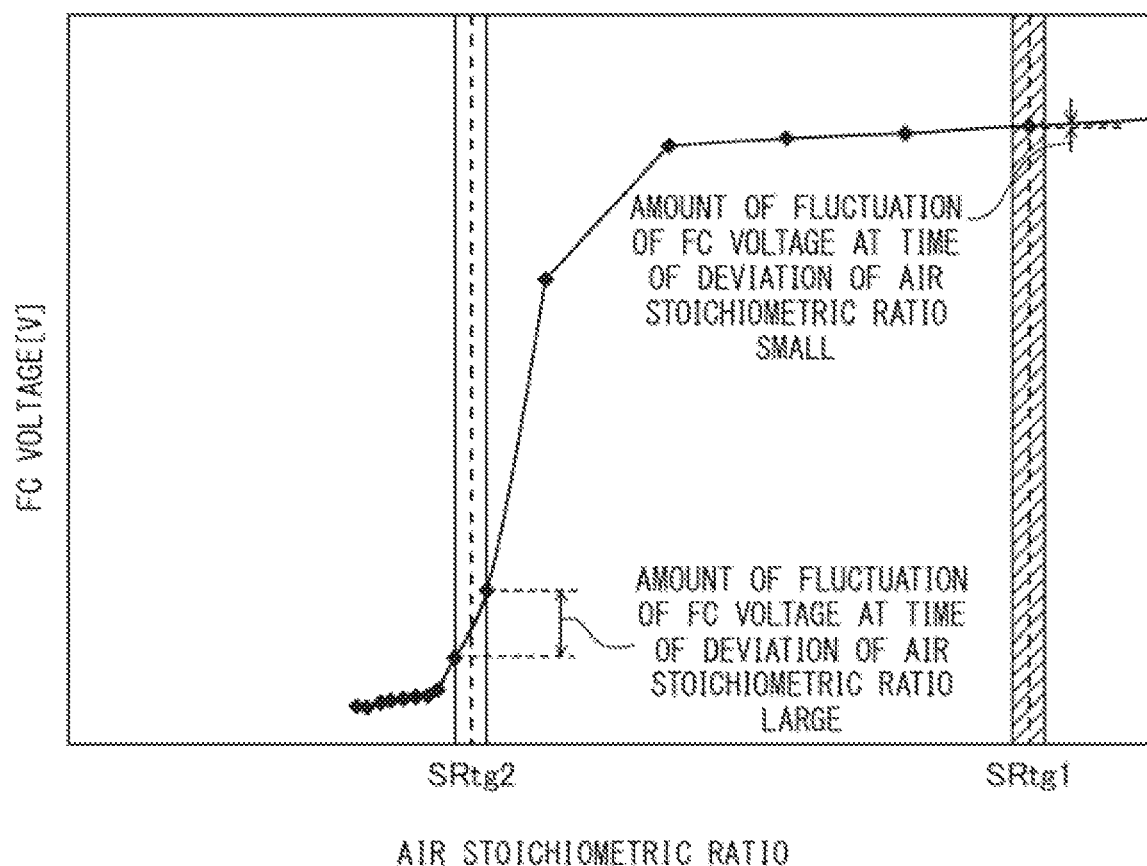
FIG. 4 is a view showing changes in an FC voltage when making an air stoichiometric ratio change in a state maintaining an FC current constant.

For this reason, as shown in FIG. 4, for example, at the time of normal operation where the FC air feed quantity Qfc is controlled so that the air stoichiometric ratio becomes a certain target air stoichiometric ratio SRtg1 in a normal region where the above-mentioned oxygen concentration overvoltage can be substantially ignored, even if the FC air feed quantity Qfc fluctuates and the air stoichiometric ratio deviates from the target air stoichiometric ratio SRtg1, the amount of fluctuation of the FC voltage Vfc is small.

As opposed to this, for example, at the time of a rapid warmup operation where the FC air feed quantity Qfc is controlled so that the air stoichiometric ratio becomes a certain target air stoichiometric ratio SRtg2 in the rapid warmup region where the above-mentioned oxygen concentration overvoltage can no longer be ignored, if the FC air feed quantity Qfc fluctuates and the air stoichiometric ratio deviates from the target air stoichiometric ratio SRtg2, the FC voltage Vfc greatly fluctuates even if the extent of deviation from the time of normal operation were the same.

In this way, when, during a rapid warmup operation, the air stoichiometric ratio deviates from the target air stoichiometric ratio, the amount of fluctuation of the FC voltage Vfc tends to become larger than the time of normal power generation.

Further, at a time of transition when the target generated electric power Ptg changes in steps, until the FC air feed quantity Qfc is controlled to the post-transition target air feed quantity Qtg, the air stoichiometric ratio will deviate from the post-transition target air stoichiometric ratio. For this reason, during a rapid warmup operation, in particular at a time of transition, the FC voltage Vfc tends to greatly deviate from the target FC voltage Vtg. As a result, the actual generated electric power Pfc tends to greatly deviate from the target generated electric power Ptg.

If the actual generated electric power Pfc becomes larger than the target generated electric power Ptg, the excess electric power at that time is charged to the battery 53. For this reason, if the excess electric power becomes greater, the charged electric power of the battery 53 is liable to become equal to or greater than the allowable charged electric power Win |kW| set according to the battery state for keeping the battery 53 from deteriorating and the battery 53 to be made to deteriorate. In particular, when using a lithium ion battery as the battery 53, if the excess electric power becomes larger, so-called "lithium deposition" where lithium deposits on the negative electrode surface of the battery 53 is liable to occur.

Further, if the actual generated electric power Pfc becomes smaller than the target generated electric power Ptg, the insufficient amount of electric power at that time is output from the battery 53. For this reason, if the insufficient amount of electric power becomes greater, the discharged electric power of the battery 53 is liable to become equal to or greater than the allowable discharged electric power Wont |kW| set in accordance with the state of the battery to keep the battery 53 from deteriorating in the same way as the allowable charged electric power Win and the battery 53 to be made to deteriorate.

Note that, in the present embodiment, the charged electric power of the battery 53 is a positive value which becomes larger in value the larger the electric power charged to the battery 53. Further, the discharged electric power of the battery 53 similarly is a positive value which becomes larger in value the larger the electric power discharged from the battery 53.

Further, the allowable charged electric power Win and the allowable discharged electric power Wout change in accordance with the battery state. For example, they tend to become smaller when the temperature of the battery 53 is low compared to when it is high. For this reason, during a rapid warmup operation, which basically is performed in an environment below the freezing point, since the temperature of the battery 53 is also low, the allowable charged electric power Win and the allowable discharged electric power Wout also tend to become smaller than at the time of normal operation. Therefore, during a rapid warmup operation, if deviation occurs between the actual generated electric power Pfc and the target generated electric power Ptg, in particular the battery 53 easily becomes an overcharged state or overdischarged state and the battery 53 easily deteriorates.

Therefore, in the present embodiment, during a rapid warmup operation, the generated electric power Pfc was intentionally made to increase and decrease with respect to the target generated electric power Ptg centered about the target generated electric power Ptg within a range where the charged electric power and discharged electric power of the battery 53 respectively did not exceed the allowable charged electric power Win and the allowable discharged electric power Wout. That is, during a rapid warmup operation, the battery 53 was made to be repeatedly charged and discharged.

The battery 53 generates heat at the time of charging and discharging, so it is possible to quickly raise the temperature of the battery 53 by repeatedly charging and discharging the battery 53 during a rapid warmup operation. As a result, the allowable charged electric power Win and the allowable discharged electric power Wout can respectively quickly be made larger, so the battery 53 can be kept from becoming an overcharged state or overdischarged state when deviation occurs between the actual generated electric power Pfc and the target generated electric power Ptg. Below, the rapid warmup control of the fuel cell system 100 accompanied with control for raising the temperature of the battery according to the present embodiment raising the temperature of the battery 53 by intentionally making the generated electric power Pfc increase and decrease in this way will be explained with reference to FIG. 5 to FIG. 12.

Figure 5:
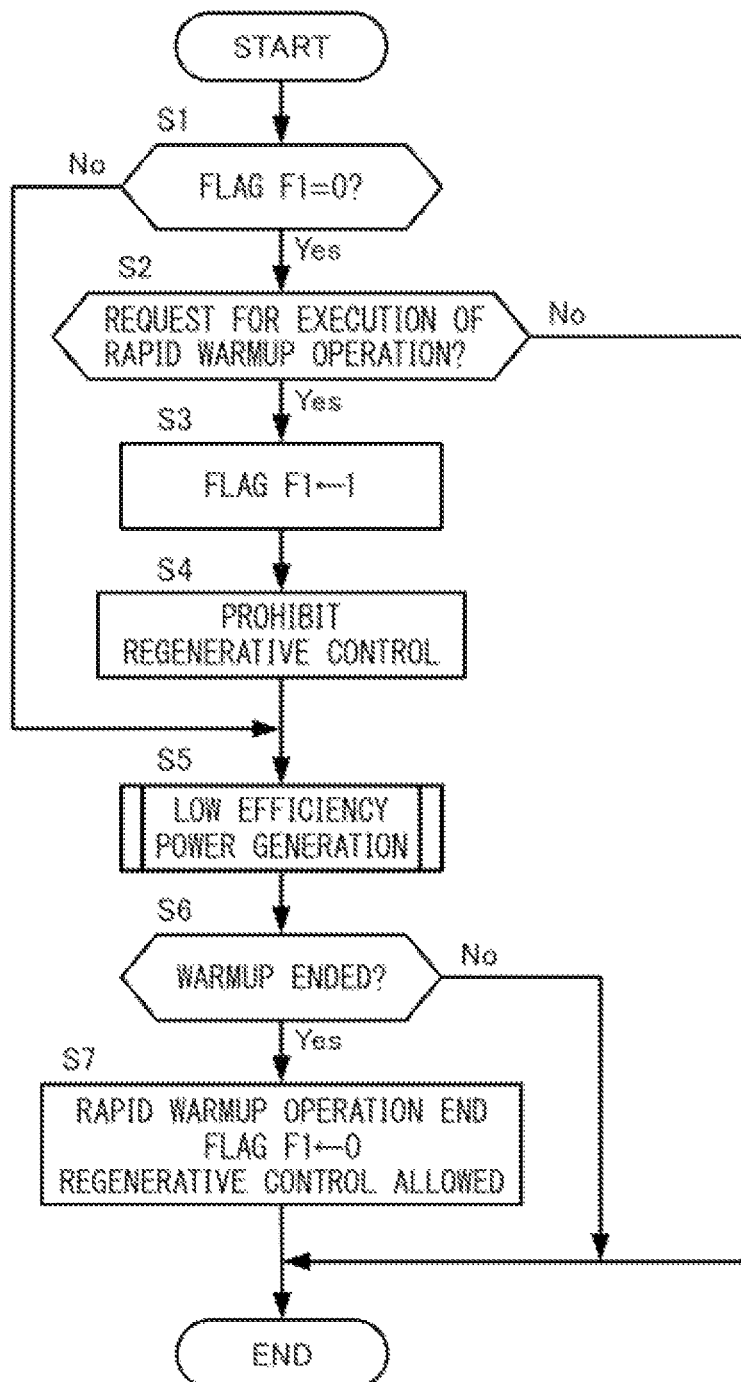
FIG. 5 is a flow chart explaining rapid warmup control of the fuel cell system accompanied with battery temperature raising processing according to one embodiment of the present disclosure.

FIG. 5 is a flow chart explaining rapid warmup control of the fuel cell system 100 accompanied with battery temperature raising processing according to the present embodiment. The electronic control unit 200 repeatedly performs the present routine at predetermined processing periods (for example 10 ins).

At step S1, the electronic control unit 200 judges if a rapid warmup flag F1 is set to 0. The rapid warmup flag F1 is a flag with an initial value set to 0, set to 1 at the time of start of a rapid warmup operation, and returned to 0 at the time of end of a rapid warmup operation. If the rapid warmup flag F1 is 0, the electronic control unit 200 proceeds to the processing of step S2. On the other hand, if the rapid warmup flag F1 is 1, the electronic control unit 200 proceeds to the processing of step S4.

At step S2, the electronic control unit 200 judges if there is a request for a rapid warmup operation. In the present embodiment, if it is the time of startup of the fuel cell system 100 and the FC temperature is equal to or less than a predetermined rapid warmup request temperature (for example 0° C.), the electronic control unit 200 judges that there is a request for a rapid warmup operation. When it judges that there is a request for a rapid warmup operation, the electronic control unit 200 proceeds to the processing of step S3. On the other hand, when it judges that there is no request for a rapid warmup operation, the electronic control unit 200 ends the current processing.

At step S3, the electronic control unit 200 sets the rapid warmup flag F1 to 1.

At step S4, the electronic control unit 200 prohibits regenerative control by the motor-generator 55. "Regenerative control" is control recovering the excess energy generated at the time of vehicle deceleration etc. as regenerated electric power by making the motor-generator 55 function as a generator. Note that the reason for prohibiting regenerative control during rapid warmup operation is as follows:

That is, the allowable charged electric power Win changes due to the battery charging rate in addition to the battery temperature. Specifically, the power tends to become smaller when the battery charging rate is high compared to when it is low. For this reason, if regenerative control is performed during a rapid warmup operation and the battery charging rate becomes higher, the allowable charged electric power Win becomes smaller. As a result, when the excess electric power becomes larger, the possibility of the charged electric power of the battery becoming equal to or greater than the allowable charged electric power Win becomes higher.

At step S5, the electronic control unit 200 performs low efficiency power generation. The detailed processing of the low efficiency power generation according to the present embodiment will be explained later with reference to FIG. 6.

At step S6, the electronic control unit 200 judges if warmup of the fuel cell stack 10 has been completed. In the present embodiment, the electronic control unit 200 judges if the FC temperature Tfc has become equal to or greater than a predetermined rapid warmup completion temperature (for example 70° C.). The electronic control unit 200 proceeds to the processing or step S7 if the FC temperature Tfc is equal to or greater than the rapid warmup completion temperature. On the other hand, the electronic control unit 200 ends the current processing if the FC temperature Tfc is less than the rapid warmup completion temperature.

At step S7, the electronic control unit 200 ends the rapid warmup operation, returns the rapid warmup flag F1 to 0, and lifts the prohibition on regenerative control.

Figure 6:
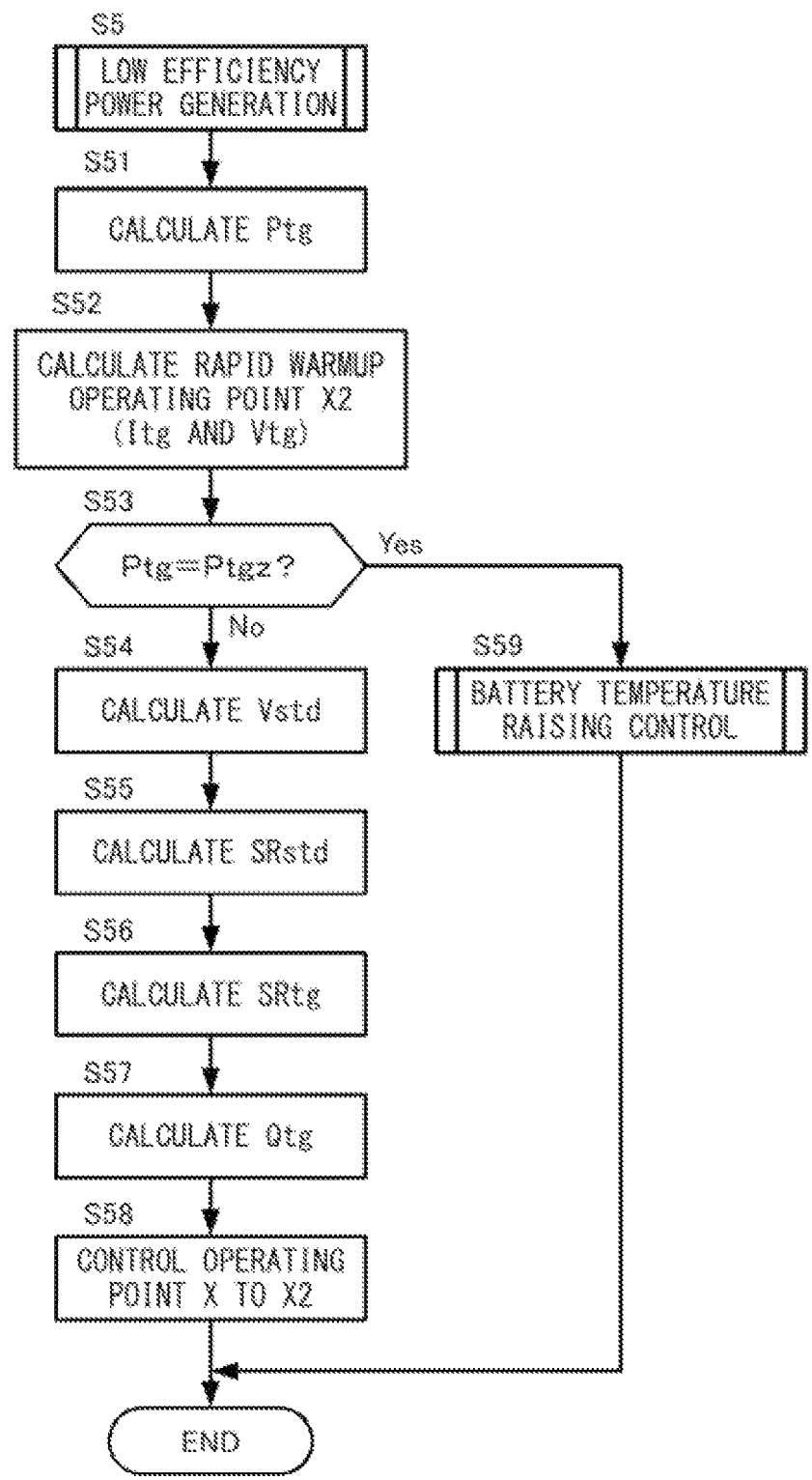
FIG. 6 is a flow chart explaining detailed processing of low efficiency power generation according to one embodiment of the present disclosure.

FIG. 6 is a flow chart explaining detailed processing of low efficiency power generation according to the present embodiment.

At step S51, the electronic control unit 200 calculates the target generated electric power Ptg of the fuel cell stack 10 based on the operating state of the fuel cell system 100. In the present embodiment, the electronic control unit 200, as explained above, calculates the total value of the requested electric power of the motor-generator 55 and the requested electric power of a compressor 33 and other various auxiliaries as the target generated electric power Ptg.

Figure 7:
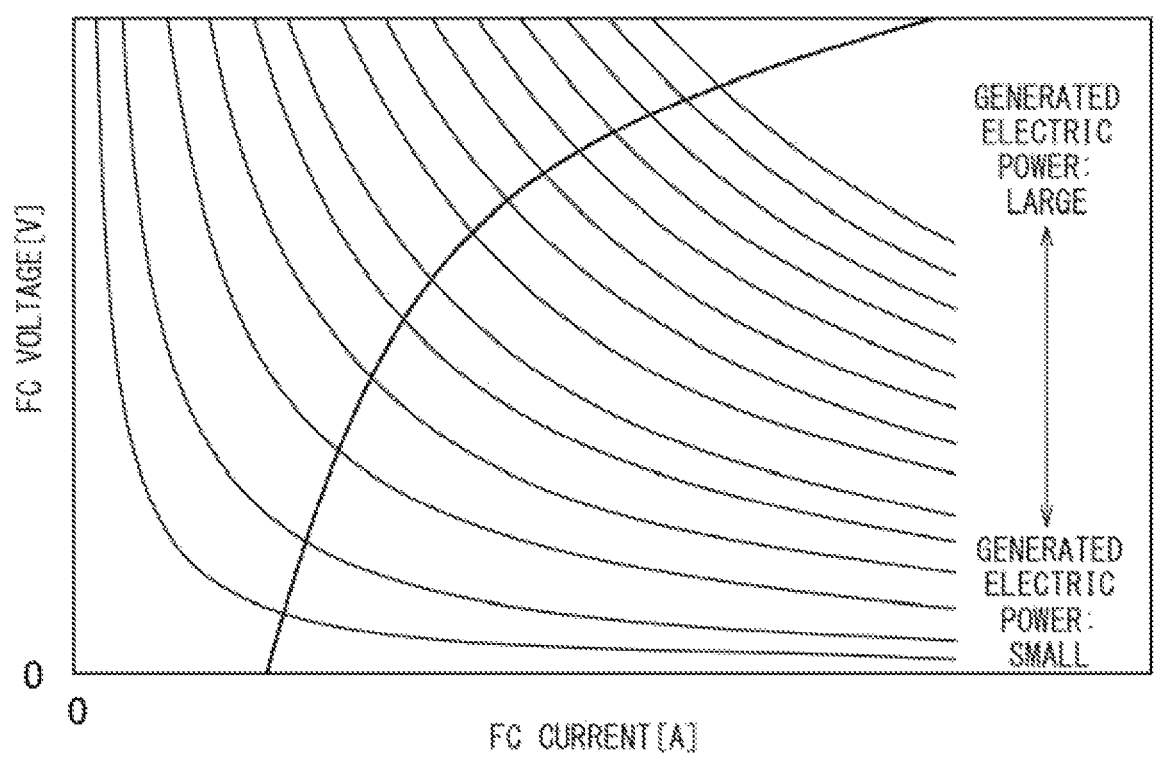
FIG. 7 is an IV characteristic map in which lines of equal power and a line of equal heat generation are drawn for calculating a rapid warmup operating point X2.

At step S52, the electronic control unit 200 refers to the IV characteristic map shown in FIG. 7 in which lines of equal power (see fine solid lines) and a line of equal heat generation (see thick solid line) are drawn and calculates the rapid warmup operating point X2, that is, target FC current. Itg and target FC voltage Vtg, based on the target generated electric power Ptg and the target heat generation PLtg [kW]. The target heat generation PLtg at the time of low efficiency power generation is made a predetermined fixed value in the present embodiment, but may also be made a variable value.

Figure 8:
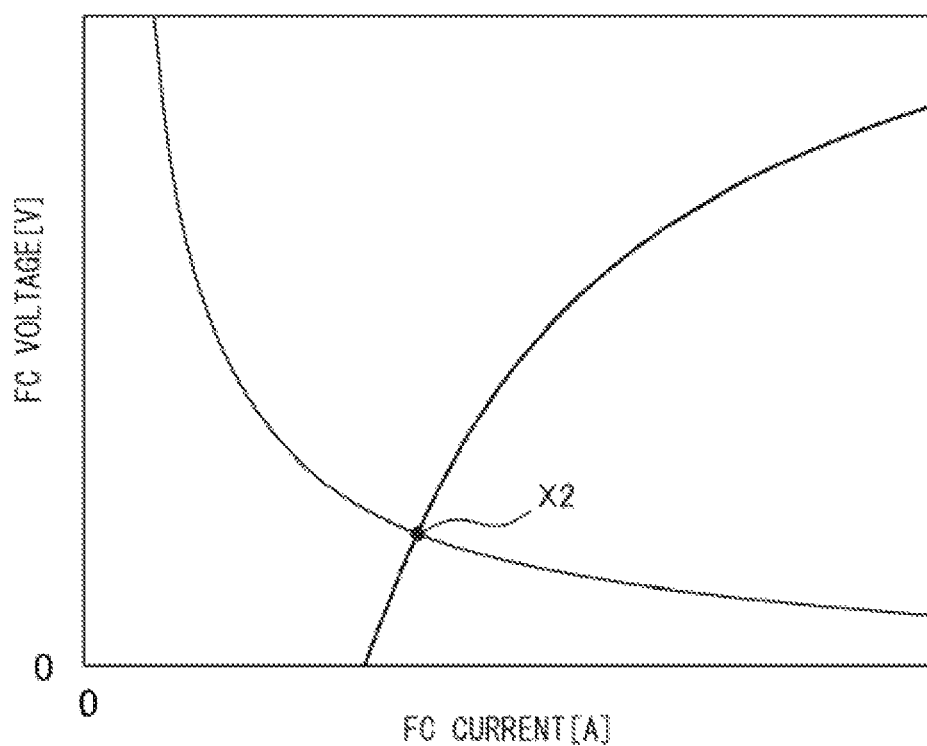
FIG. 8 is a view explaining a method of calculation of the rapid warmup operating point X2.

Specifically, the electronic control unit 200, as shown in FIG. 8, selects the line of equal power enabling generation of the target generated electric power Ptg from among the lines of equal power and calculates the point at which the selected line of equal power and line of equal heat generation enabling the amount of heat generation to be made the target heat generation PLtg on the IV characteristic map intersect as the rapid warmup operating point X2.

At step S53, the electronic control unit 200 judges if it is the time of transition or if it is a steady time. Specifically, the electronic control unit 200 judges that it is the time of transition if the target generated electric power Ptg differs from the previous value Ptgz and judges it a steady time if the target generated electric power Ptg is the same as the previous value Ptgz. Further, when it is judged that it is the time of transition, the electronic control unit 200 proceeds to the processing of step S54 to control the operating point X to the new rapid warmup operating point X2 calculated at step S52. On the other hand, if at a steady time, the electronic control unit 200 proceeds to the processing of step S59.

Figure 9:
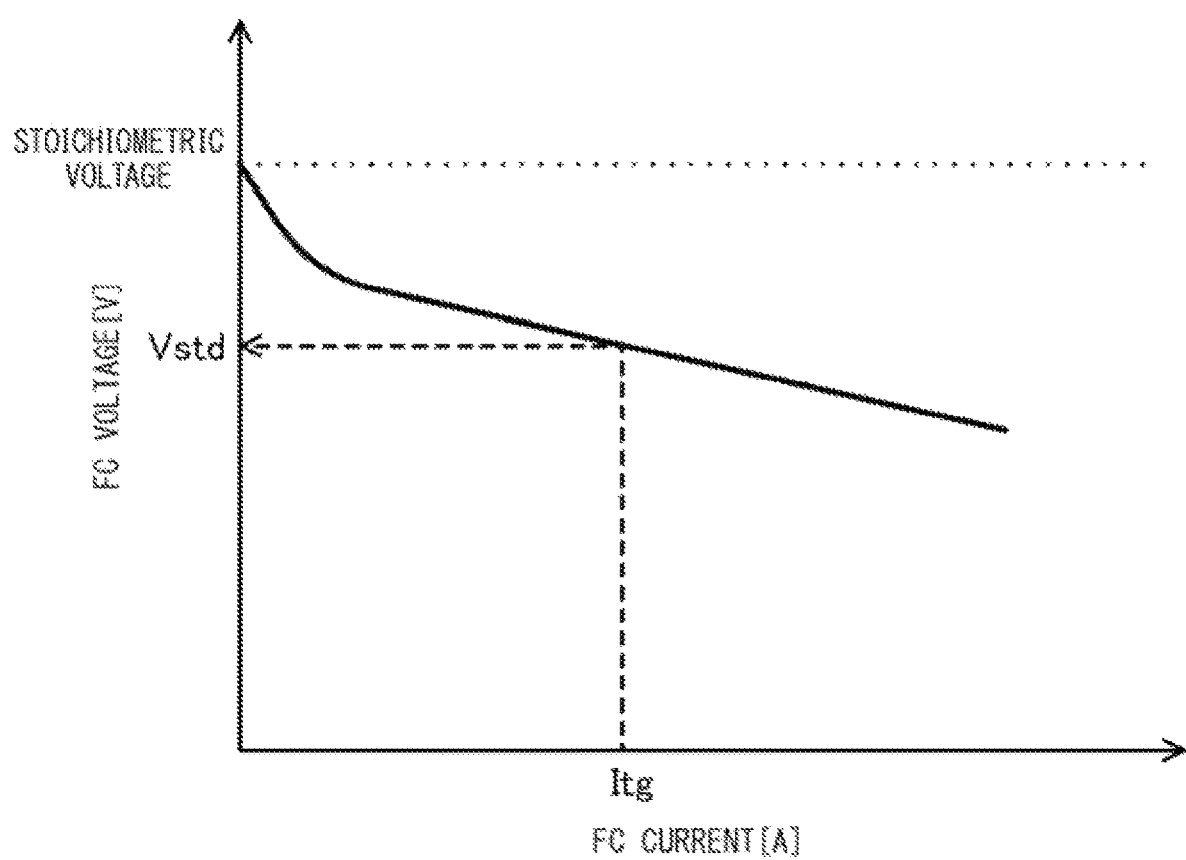
FIG. 9 is a standard IV characteristic map for calculating a standard FC voltage.

At step S54, the electronic control unit 200 refers to the standard IV characteristic map shown in FIG. 9 and calculates the FC voltage Vstd when controlling the FC current Ifc to the target FC current Itg on the standard IV characteristic (below, referred to as the "standard FC voltage"). In other words, the standard FC voltage Vstd is the FC voltage when performing high efficiency power generation (normal power generation) to control the FC current Ifc to the target FC current Itg.

Note that the standard IV characteristic changes according to the FC temperature Tfc, so a plurality of standard IV characteristic maps are prepared for each FC temperature. Therefore, the electronic control unit 200 refers to the optimal standard IV characteristic map corresponding to the current FC temperature Tfc from among the plurality of standard IV characteristic maps and calculates the standard FC voltage Vstd.

Figure 10:
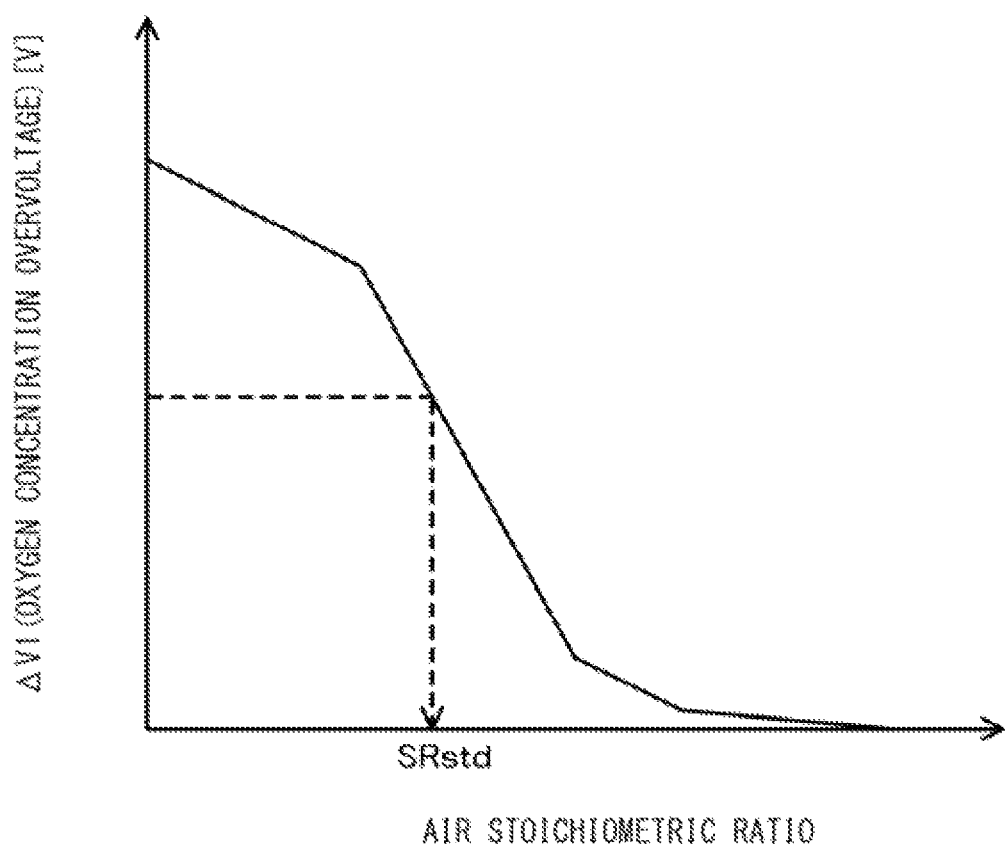
FIG. 10 is a map showing a relationship between the air stoichiometric ratio and the oxygen concentration overvoltage for calculating a standard air stoichiometric ratio.

At step S55, the electronic control unit 200 refers to the map showing the relationship between the air stoichiometric ratio and the oxygen concentration overvoltage shown in FIG. 10 similar to FIG. 3 and calculates the standard air stoichiometric ratio SRstd based on the difference ΔV1 between the standard FC voltage Vstd and the target FC voltage Vtg (that is, the oxygen concentration overvoltage required to be caused for making the standard FC voltage Vstd fall to the target FC voltage Vtg) (=Vstd−Vtg).

At step S56, the electronic control unit 200 calculates a feedback correction value for the standard air stoichiometric ratio SRstd based on the difference ΔV2 between the target FC voltage Vtg and FC voltage Vfc (below, referred to as the FC voltage difference") (=Vtg−Vfc) and adds the feedback correction value to the standard air stoichiometric ratio SRstd to thereby calculate the target air stoichiometric ratio SRtg.

At step S57, the electronic control unit 200 multiplies the stoichiometric FC air feed quantity Qth required for generating the target generated electric power Ptg with the target air stoichiometric ratio SRtg to thereby calculate the target FC air feed quantity Qtg.

At step S58, the electronic control unit 200 controls the control parts so that the operating point X defined by the FC current Ifc and FC voltage Vfc becomes the rapid warmup operating point X2.

Specifically, the electronic control unit 200 controls the first converter 51 to control the FC current Ifc to the target FC current Itg and control the FC air feed quantity Qfc to the target air feed quantity Qtg. At this time, the electronic control unit 200 controls the compressor 33 so that the total air feed quantity Qafc becomes constant while controlling the opening degrees of the cathode inlet valve 35, distribution valve 37, and cathode pressure control valve 39 to thereby control the FC air feed quantity Qfc to the target air feed quantity Qtg.

At step S59, the electronic control unit 200 performs battery temperature raising control intentionally making the generated electric power Pfc increase and decrease to make the battery temperature rise. Details of the battery temperature raising control will be explained with reference to FIG. 11.

Figure 11:
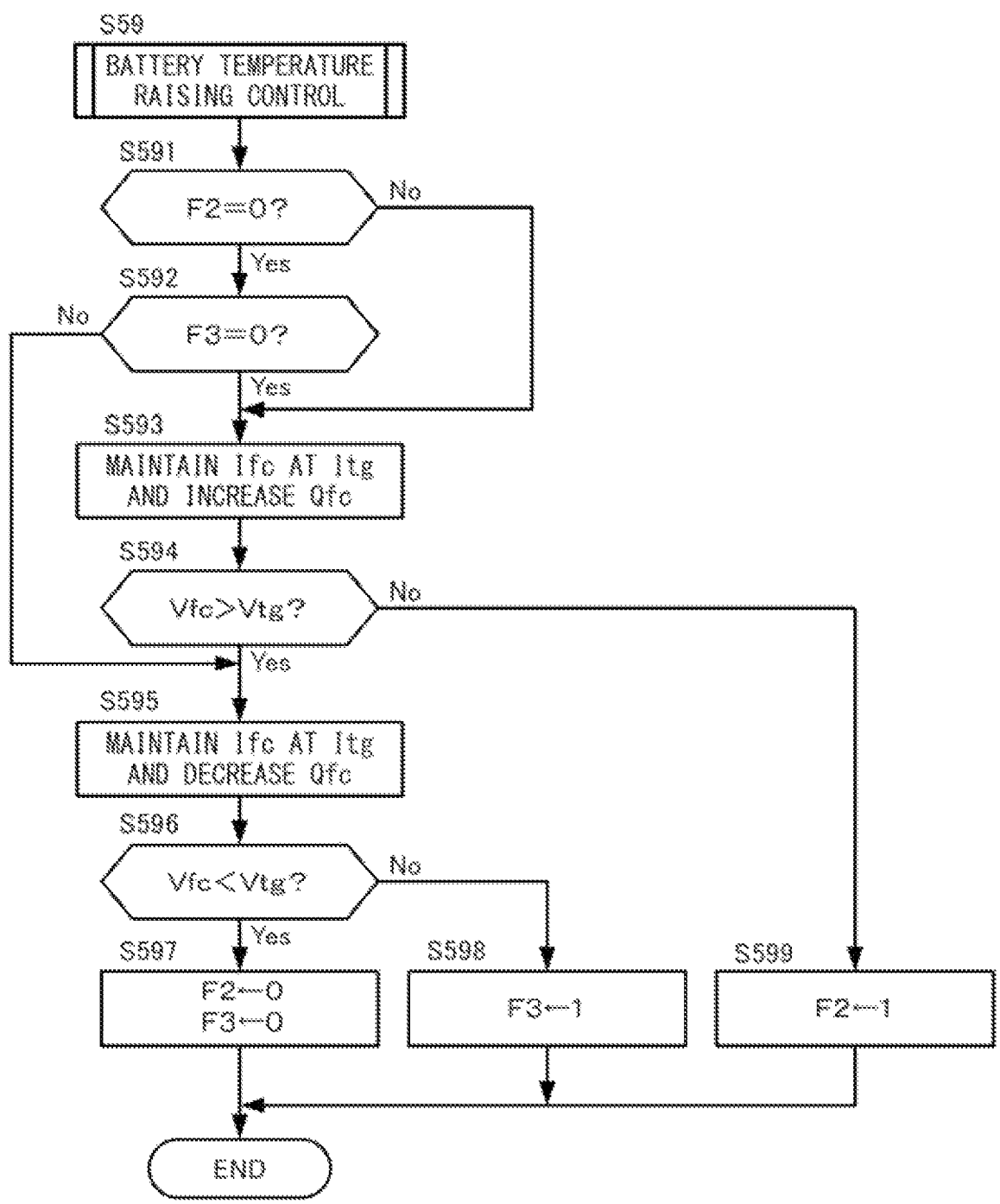
FIG. 11 is a flow chart explaining details of battery temperature raising processing according to one embodiment of the present disclosure.

FIG. 11 is a flow chart explaining details of battery temperature raising processing.

At step S591, the electronic control unit 200 judges if an air increase flag F2 is set to 0. The air increase flag F2 is a flag set to 1 when making the air stoichiometric ratio and in turn the FC air feed quantity Qfc increase to make the FC voltage Vfc higher than the target FC voltage Vtg (to make the generated electric power Pfc larger than the target generated electric power Ptg). Its initial value is set to 0. If the air increase flag F2 is set to 0, the electronic control unit 200 proceeds to the processing of step S592. On the other hand, if the air increase flag F2 is set to 1, the electronic control unit 200 proceeds to the processing of step S593.

At step S592, the electronic control unit 200 judges if an air decrease flag F3 is set to 0. The air decrease flag F3 is a flag set to 1 when making the air stoichiometric ratio and in turn the FC air feed quantity Qfc decrease to make the FC voltage Vfc lower than the target FC voltage Vtg (to make the generated electric power Pfc smaller than the target generated electric power Ptg). Its initial value is set to 0. If the air decrease flag F3 is set to 0, the electronic control unit 200 proceeds to the processing of step S593. On the other hand, if the air decrease flag F3 is set to 1, the electronic control unit 200 proceeds to the processing of step S595.

At step S593, the electronic control unit 200 makes the FC air feed quantity Qfc increase so that the FC voltage Vfc becomes larger than the target FC voltage Vtg while maintaining the FC current Ifc at the target FC current Ifc.

Specifically, the electronic control unit 200 updates the target air stoichiometric ratio SRtg to the initial target air stoichiometric ratio SRtg at which the FC voltage Vfc can be made the target FC voltage Vtg plus the predetermined value α. In the present embodiment, the predetermined value α is set to a value of about 0.1 or so, but the disclosure is not limited to this. It may also be suitably changed within the range where overcharging of the battery 53 and lithium deposition can be prevented. Further, the stoichiometric FC air feed quantity Qth required for generating the target generated electric power Ptg is multiplied with the updated target air stoichiometric ratio SRtg to update the target FC air feed quantity Qtg, and the FC air feed quantity Qfc is controlled to the updated target FC air feed quantity Qtg to make the FC air feed quantity Qfc increase.

At step S594, the electronic control unit 200 judges if the FC voltage Vfc is larger than the target FC voltage Vtg. If the FC voltage Vfc is larger than the target FC voltage Vtg, the electronic control unit 200 proceeds to the processing of step S595. On the other hand, if the FC voltage Vfc is equal to or lower than the target FC voltage Vtg, the electronic control unit 200 proceeds to the processing of step S599.

At step S595, the electronic control unit 200 makes the FC air feed quantity Qfc decrease so that the FC voltage Vfc becomes smaller than the target FC voltage Vtg as well while maintaining the FC current Ire at the target FC current Ifc.

Specifically, the electronic control unit 200 updates the target air stoichiometric ratio SRtg to the initial target air stoichiometric ratio SRtg at which the FC voltage Vfc can be made the target FC voltage Vtg minus a predetermined value β. In the present embodiment, the predetermined value β is set to a value of generally 0.1 or so the same as the predetermined value α, but the disclosure is not limited to this. It may also be suitably changed within a range able to prevent overdischarge of the battery 53. Further, the stoichiometric FC air feed quantity Qth required for generating the target generated electric power Ptg is multiplied with the updated target air stoichiometric ratio SRtg to update the target FC air feed quantity Qtg, and the FC air feed quantity Qfc is controlled to the updated target FC air feed quantity Qtg to make the FC air feed quantity Qfc decrease.

At step S596, the electronic control unit 200 judges if the FC voltage Vfc is smaller than the target FC voltage Vtg. If the FC voltage Vfc is smaller than the target FC voltage Vtg, the electronic control unit 200 proceeds to the processing of step S597. On the other hand, if the FC voltage Vfc is equal to or greater than the target FC voltage Vtg, the electronic control unit 200 proceeds to the processing of step S598.

At step S597, the electronic control unit 200 returns the flag F2 and the flag F3 to respectively 0.

At step S598, the electronic control unit 200 returns the flag F3 to 0.

At step S599, the electronic control unit 200 returns the flag F2 to 0.

In this way, in the present embodiment, the FC air feed quantity Qfc is made to increase or decrease by making the air stoichiometric ratio increase or decrease by about 0.1 or so with respect to the initial target air stoichiometric ratio SRtg at which the FC voltage Vfc can be made the target FC voltage Vtg.

Figure 12:
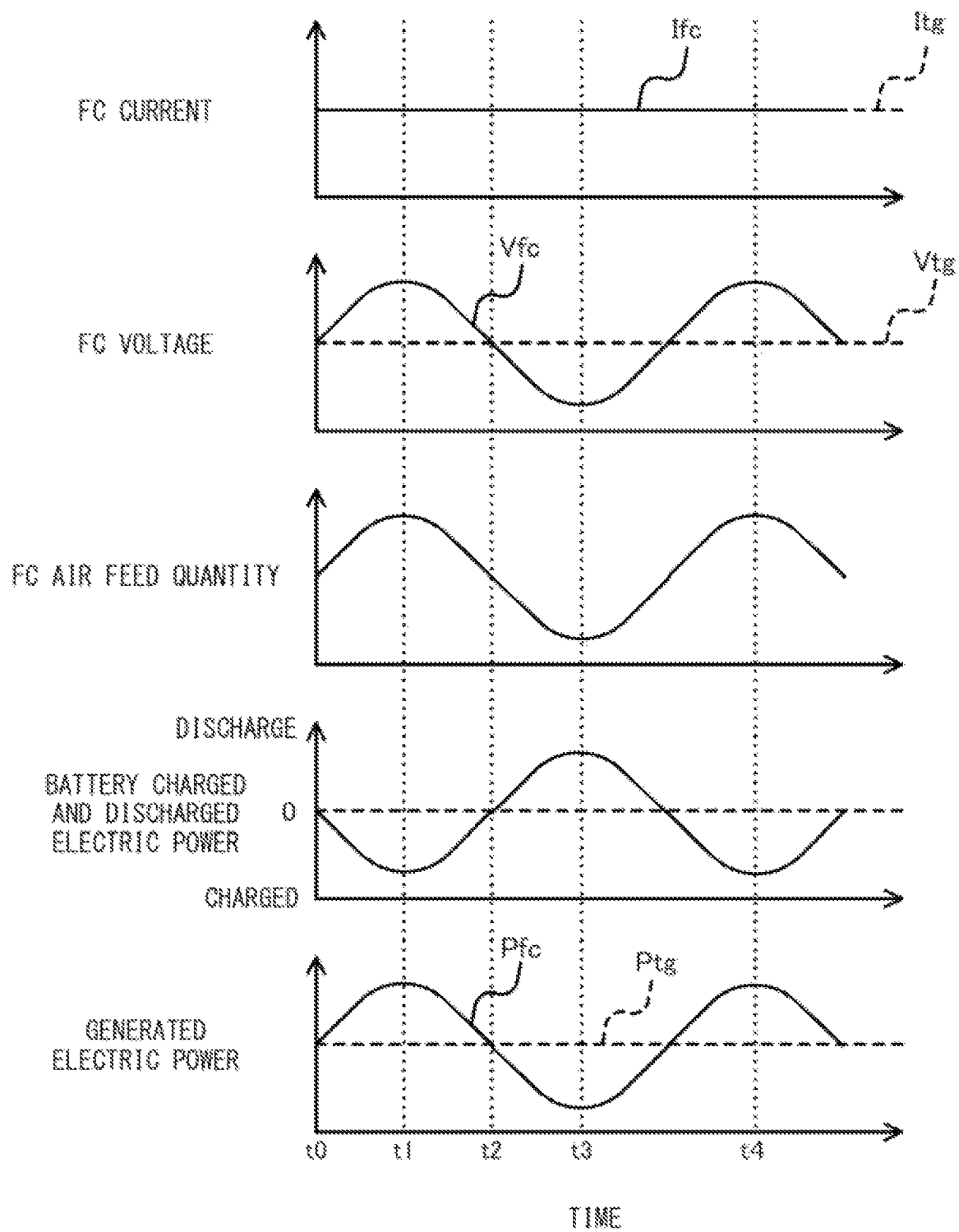
FIG. 12 is a time chart explaining an operation during battery temperature raising processing according to one embodiment of the present disclosure.

FIG. 12 is a time chart explaining an operation on the FC current etc. during battery temperature raising processing.

As shown in FIG. 12, at the time t0, if battery temperature raising processing is started, the FC air feed quantity Qfc is made to increase so that the FC voltage Vfc becomes higher than the target FC voltage Vtg while maintaining the FC current Ifc at the target FC current Ifc. Due to this, at the time t0 and on, the oxygen concentration overvoltage decreases and the FC voltage Vfc gradually rises. As a result, the generated electric power Pfc increases and becomes larger than the target generated electric power Ptg as well, so the excess electric power is charged to the battery 53.

At the time t1, if it is judged that the FC voltage Vfc has become higher than the target FC voltage Vtg, the FC air feed quantity Qfc is made to decrease so that the FC voltage Vfc becomes lower than the target FC voltage Vtg as well while maintaining the FC current Ifc at the target FC current Ifc. Due to this, at the time t1 and on, the oxygen concentration overvoltage increases and the FC voltage Vfc gradually falls so, as a result, the generated electric power Pfc also decreases. Further, at the time t2 and on, the generated electric power Pfc becomes smaller than the target generated electric power Ptg as well, so the insufficient amount of electric power is output from the battery 53.

At the time t3 if it is judged that the voltage Vfc has become lower than the target FC voltage Vtg, the FC air feed quantity Qfc is again made to increase so that the FC voltage Vfc becomes higher than the target FC voltage Vtg while maintaining the FC current Ifc at the target FC current Ifc. Further, at the time t4, if it is judged that the voltage Vfc has become higher than target FC voltage Vtg as well, the FC air feed quantity Qfc is again made to decrease so that the FC voltage Vfc becomes lower than the target FC voltage Vtg while maintaining the FC current Ifc at the target FC current Ifc.

In this way, by making the air stoichiometric ratio and in turn the FC air feed quantity Qfc change so that the FC voltage Vfc increases and decreases above and below the target FC voltage Vtg, it is possible to repeatedly make the generated electric power Pfc change so as to become above and below the target generated electric power Ptg. For that reason, it is possible to repeatedly charge and discharge the battery 53, so the temperature of the battery 53 can be quickly raised. As a result, the allowable charged electric power Win and the allowable discharged electric power Wout can respectively be quickly enlarged, so when deviation occurs between the actual generated electric power Pfc and the target generated electric power Ptg, the battery 53 can be kept from becoming an overcharged state or overdischarged state.

Note that in the example shown in FIG. 12, the period when repeatedly charging and discharging the battery 53 (the time period from the time t1 to the time t4) is about 0.5 second, but this may be suitably changed. However, if one period is made too long, the time period during which the battery 53 is charged with excess electric power becomes longer. If this is so, even when the excess electric power is small, lithium deposition is liable to occur. Therefore, if lengthening the period when repeatedly charging and discharging the battery 53, it is desirable to lengthen it within a range where lithium deposition does not occur.

The fuel cell system 100 according to the present embodiment explained above is provided with a fuel cell stack 10 (fuel cell) generating electric power by electrochemical reactions between hydrogen as the fuel gas and air as the oxidizing agent gas, a battery 53 (rechargeable battery) charged with excess electric power and discharging the insufficient amount of electric power at the time of power generation of the fuel cell stack 10, and an electronic control unit 200 (control device). The electronic control unit 200 is provided with a low efficiency power generation part performing low efficiency power generation where the power generation loss becomes greater compared with normal power generation.

Further, the low efficiency power generation part is configured so as to provide an operating point setting part setting the target FC current Itg and target FC voltage Vtg defining the operating point of the fuel cell stack 10 at the time of a low efficiency power generation and a generated electric power control part controlling the FC current Ife to the target FC current Itg at the time or low efficiency power generation while making the FC air feed quantity Qfc change to make the generated electric power Pfc increase and decrease so that the FC voltage Vfc increases and decreases above and below the target FC voltage Vtg within a range where the charged and discharged electric powers of the battery 53 do not become larger than the allowable charged and discharged electric power Win, Wout of the battery 53.

Due to this, it is possible to repeatedly increase and decrease the generated electric power Pfc so as to become above and below the target generated electric power Ptg, so it is possible to repeatedly charge and discharge the battery 53. For this reason, the temperature of the battery 53 can be rapidly raised. As a result, the allowable charged electric power Win and the allowable discharged electric power Wout can be respectively quickly made larger, so when deviation occurs between the actual generated electric power Pfc and the target generated electric power Ptg, the battery 53 can be kept from becoming the overcharged state or the overdischarged state.

Further, the electronic control unit 200 according to the present embodiment is further provided with a regenerative control prohibiting part prohibiting regenerative control recovering the excess energy of the fuel cell system 100 as regenerated electric power at the battery 53 by the motor-generator 55 at the time of low efficiency power generation.

The allowable charged electric power Win of the battery 53 changes due to the battery charging rate in addition to the battery temperature. Specifically, compared to when the battery charging rate is low, the power tends to become smaller when the rate is high. For this reason, if regenerative control is performed during a rapid warmup operation performed at the time of low efficiency power generation and the battery charging rate becomes higher, the allowable charged electric power Win becomes smaller and the battery 53 is liable to become an overcharged state.

Therefore, like in the present embodiment, by prohibiting regenerative control during a rapid warmup operation performed at the time of low efficiency power generation, it is possible to keep regenerative control from ending up being performed during a rapid warmup operation and the allowable charged electric power Win from becoming smaller. As a result, when excess electric power is generated, the battery 53 can be kept from becoming an overcharged state.

Above, an embodiment of the present disclosure was explained, but the above embodiment merely shows part of the examples of application of the present disclosure and is not meant to limit the technical scope of the present disclosure to the specific constitution of the above embodiment.

For example, in the above embodiment, the explanation was given with reference to the example of the case of the fuel cell system 100 being mounted in a vehicle, but the system may also be mounted in various types of moving bodies not limited to vehicles. Further, it may also be a stationary system.

The invention claimed is:

1. A fuel cell system comprising:
    a fuel cell configured to generate electric power by electrochemical reactions between a fuel gas and an oxidizing agent gas;
    a rechargeable battery configure to be charged with excess electric power and discharge an insufficient amount of electric power, at a time of electric power generation of the fuel cell;
    a motor-generator; and
    a control device, wherein
    the control device comprises a low efficiency power generation part configured to perform low efficiency power generation in which a power generation loss becomes greater than in normal power generation, and wherein
    the low efficiency power generation part comprises:
    an operating point setting part configured to set a target current and target voltage defining an operating point of the fuel cell at the time of low efficiency power generation; and
    a generated electric power control part configured to control a current of the fuel cell to the target current at the time of low efficiency power generation, and to make the generated electric power increase and decrease by making a flow rate of feed of oxidizing agent gas supplied to the fuel cell change so that a voltage of the fuel cell increases and decreases above and below the target voltage within a range where the charged and discharged electric powers of the rechargeable battery do not become larger than an allowable charged and discharged electric powers of the rechargeable battery;
    wherein the control device further comprises a regenerative control prohibiting part configured so as to prohibit regenerative control recovering excess energy by using the motor-generator to the rechargeable battery at the time of low efficiency power generation.

2. A control method for a fuel cell system, wherein
the fuel cell system comprises:
    a fuel cell configured to generate electric power by electrochemical reactions between a fuel gas and an oxidizing agent gas;
    a rechargeable battery configured to be charged with excess electric power and discharge an insufficient amount of electric power, at a time of electric power generation of the fuel cell, and
    a motor-generator; and wherein
the control method comprises:
    setting a target current and target voltage defining an operating point of the fuel cell, at the time of low efficiency power generation in which a power generation loss becomes greater than in normal power generation; and
    controlling a current of the fuel cell to the target current at the time of low efficiency power generation, and making the generated electric power increase and decrease by making a flow rate of feed of oxidizing agent gas supplied to the fuel cell change so that a voltage of the fuel cell increases and decreases above and below the target voltage within a range where the charged and discharged electric powers of the rechargeable battery do not become larger than an allowable charged and discharged electric powers of the rechargeable battery; and
    using the motor-generator to prohibit regenerative control recovering excess energy to the rechargeable battery at the time of low efficiency power generation.

* * * * *